(12) United States Patent
Davis et al.

(10) Patent No.: US 7,289,699 B1
(45) Date of Patent: Oct. 30, 2007

(54) GRATING APODIZATION TECHNIQUE FOR DIFFUSED OPTICAL WAVEGUIDES

(75) Inventors: Richard L. Davis, Redondo Beach, CA (US); James G. Ho, Los Angeles, CA (US); Akhil R. Shah, Los Angeles, CA (US); Thomas J. Jung, Rolling Hills Estates, CA (US); Terrance T. Lam, Montebello, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 158 days.

(21) Appl. No.: 10/835,413

(22) Filed: Apr. 29, 2004

(51) Int. Cl.
*G02B 6/34* (2006.01)
*G02B 6/10* (2006.01)

(52) U.S. Cl. .......................... 385/37; 385/129
(58) Field of Classification Search ............ None
See application file for complete search history.

(56) References Cited

U.S. PATENT DOCUMENTS

| | | | |
|---|---|---|---|
| 6,327,404 B1 | 12/2001 | Horita et al. | |
| 6,771,844 B2* | 8/2004 | Chang et al. | 385/2 |
| 2004/0037503 A1* | 2/2004 | Hastings et al. | 385/37 |

FOREIGN PATENT DOCUMENTS

| | | |
|---|---|---|
| EP | 0 632 298 A2 | 6/1994 |
| EP | 0 753 767 A2 | 1/1997 |
| WO | WO99/64905 | 12/1999 |
| WO | WO 03/102646 A2 | 12/2003 |
| WO | WO 2004057390 A1 | 7/2004 |

OTHER PUBLICATIONS

Greiner, et al: "Bandpass Engineering of Lithographically Scribed Channel-Waveguide Bragg Gratings"; XP-002335043, Optics Letters/vol. 29, No. 8/Apr. 15, 2004, pp. 806-808.
European Search Report for corresponding EP 05 00 9132, filed Apr. 26, 2005, completed Jul. 7, 2005 by Examiner A. Frisch in Munich.

* cited by examiner

*Primary Examiner*—Sung Pak
(74) *Attorney, Agent, or Firm*—Tarolli, Sundheim, Covell & Tummino LLP

(57) ABSTRACT

An optical channel waveguide having a reflection grating and a related method for its fabrication. The grating is apodized to provide a desired reflection or transmission spectral characteristic, by varying the grating width along the length of the grating in the direction of light propagation. The grating has multiple parallel elements extending across the waveguide channel width, and apodization is effected by appropriate selection of the width of each element relative to the width of the channel, without varying the grating duty cycle or other parameters.

11 Claims, 2 Drawing Sheets

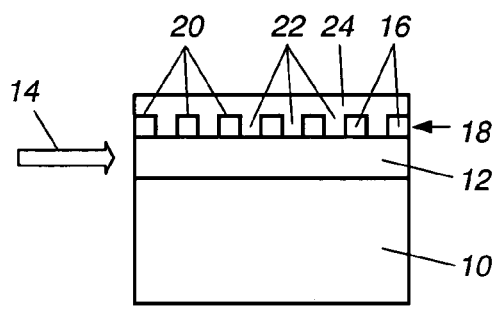
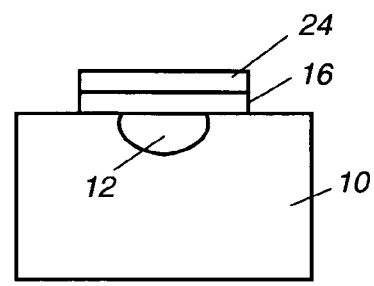
FIG. 1  FIG. 2
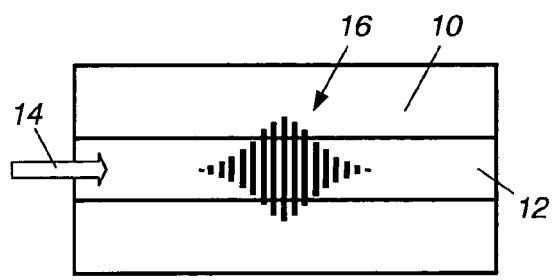
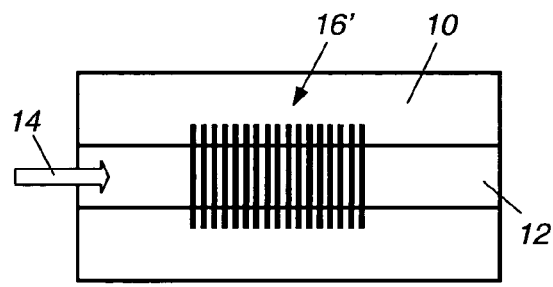
FIG. 3  FIG. 4

GRATING APODIZATION TECHNIQUE FOR DIFFUSED OPTICAL WAVEGUIDES

This invention was made with Government support under Contract No. N66001-02-C-8020 awarded by the Department of Defense. The Government has certain rights in this invention.

BACKGROUND OF THE INVENTION

This invention relates generally to optical channel waveguides and, more particularly, for techniques for obtaining a desired optical reflection and transmission filter response in optical channel waveguides. Optical waveguides have a variety of both military and commercial applications, such as in optical signal processing, optical networking and related communication systems. In processing optical signals, there is frequently a need to provide filtering function and one well known way of achieving this is an optical grating, such as a Bragg grating, integrated into a waveguide. A grating is a periodic structure either formed in the surface of a waveguide or embedded in the volume of the waveguide as variations in refractive index. Regardless of its form, the grating provides periodic perturbation of a propagation constant associated with optical energy propagating through the waveguide. Reflections from the grating elements may interfere constructively or destructively, affecting the reflection and transmission filter response characteristic of the waveguide.

Optical waveguides, of course, take various forms, such as optical fibers, planar waveguides and other waveguides of various cross sectional shapes. The present invention is concerned, however, with optical channel waveguides, which have some practical advantages over other types of waveguides. In particular, optical channel waveguides may be conveniently fabricated using conventional lithographic techniques and may, therefore, be easily integrated with electro-optical and electronic components. An optical channel waveguide can be formed by modifying a property of a suitable substrate to provide confinement of optical energy to a narrow channel at or near the surface of the substrate. For example, a channel waveguide may be formed on a substrate of dielectric material, such as lithium niobate ($LiNbO_3$), often referred to by the abbreviation LNO. For example, a known channel waveguide structure includes a channel region formed by the diffusion of a metal, such as titanium (Ti) into a planar surface of the LNO material. The Ti:LNO channel region has a slightly higher refractive index than the surrounding LNO material and functions as a channel waveguide when light is launched into it.

An optical grating may be formed on or in an optical channel waveguide, either in the form of surface relief grating elements extending perpendicular to the direction of light propagation along the channel waveguide, or by modulating the refractive index within the channel structure. Although the principles of optical channel waveguides are well known, and the use of optical gratings in conjunction with optical channel waveguides is known, no-one prior to the present invention has conceived a technique for selectively controlling the characteristics of optical gratings in a convenient manner to achieve desired optical filter characteristics.

It is known that the physical structure of an optical grating may be apodized, i.e., selectively weighted, in some manner to achieve a desired filter characteristics. A paper by D. Wiesmann et al., "Apodized Surface-Corrugated Gratings With Varying Duty Cycles," IEEE Photonics Technology Letters, Vol. 12, No. 6, June 2000, pp. 639-641, proposes that surface corrugations forming a Bragg grating may be apodized by varying the duty cycle of the corrugations. That is to say, the length of the corrugations as measured in the principal direction of propagation (perpendicular to the direction in which the parallel corrugations are oriented) is varied while the periodic spacing between corrugations is maintained constant. Varying the grating duty cycle requires varying the size of each grating ridge, from the smallest achievable size to the largest achievable while still forming a grating groove between ridges. This requires a very precise, and therefore costly, fabrication technique, which is probably why the authors of the paper referenced above described the proposed structure as best implemented using electron beam lithography.

It will be appreciated from the foregoing that there is a need for a more convenient, reliable and economical technique for forming an apodized optical grating on or in an optical channel waveguide. The present invention is directed to this end.

SUMMARY OF THE INVENTION

The present invention resides in a technique for forming an apodized optical grating more easily and conveniently than techniques of the prior art. Briefly, and in general terms, the optical channel waveguide and grating of the invention comprises a substrate; a waveguide channel formed in the substrate, the channel having a length dimension along which light may be propagated and a width dimension; and a periodic grating formed in close association with the waveguide channel, to provide reflection of light at selected frequencies and transmission through the waveguide at other frequencies. The periodic grating has multiple parallel elements extending at least part-way across the width dimension of the channel. The length of each grating element, extending in the width dimension across the channel, is selected to provide an apodized grating with a desired reflection spectral characteristic. For example, the lengths of the grating elements may be selected to provide Gaussian apodization.

More specifically, the substrate is a dielectric material and the waveguide channel is formed in the substrate by diffusing a metal into the dielectric material. As further disclosed below, in a presently preferred embodiment of the invention the grating elements are formed as parallel ridges of a material overlying the waveguide channel in a grating region, separated by grooves filled with a relatively high refractive index material. By way of example, the substrate material may be lithium niobate; the metal diffused into the substrate to form the channel may be titanium; the material overlying the waveguide channel in the grating region may be silicon dioxide; and the relatively high refractive index material may be niobium pentoxide.

The invention may also be defined in terms of a fabrication method, comprising the steps of forming a surface channel having an elevated refractive index, in a dielectric substrate, the channel having a length dimension along which light may be propagated and a width dimension perpendicular to the length dimension; and forming a plurality of parallel grating elements over the substrate and extending in the channel width direction at least part-way across the channel. The grating elements are selected in length to provide apodization of the grating, resulting in a desired spectral characteristic of the resulting waveguide filter.

It will be appreciated from the foregoing summary that the present invention represents a significant advance in the field of optical channel waveguides with Bragg-type reflection gratings. In particular, the invention provides a greatly improved technique for forming a grating with a desired reflection or transmission spectral function. Other aspects and advantages of the invention will become apparent from the following more detailed description, considered in conjunction with the accompanying drawings.

BRIEF DESCRIPTION OF THE DRAWING

FIG. 1 is a cross-sectional view of an optical channel waveguide and grating structure in accordance with the invention, viewed from one side of the optical channel.

FIG. 2 is a cross-sectional view of the optical channel waveguide and grating structure shown in FIG. 1, viewed along the propagation direction of the channel.

FIG. 3 is a top plan view of the optical channel waveguide and grating structure of FIGS. 1 and 2, shown at a reduced scale to depict apodization of the grating.

FIG. 4 is a top plan view similar to FIG. 3, but with uniform (not apodized) grating elements.

DETAILED DESCRIPTION OF THE INVENTION

Figure 6:
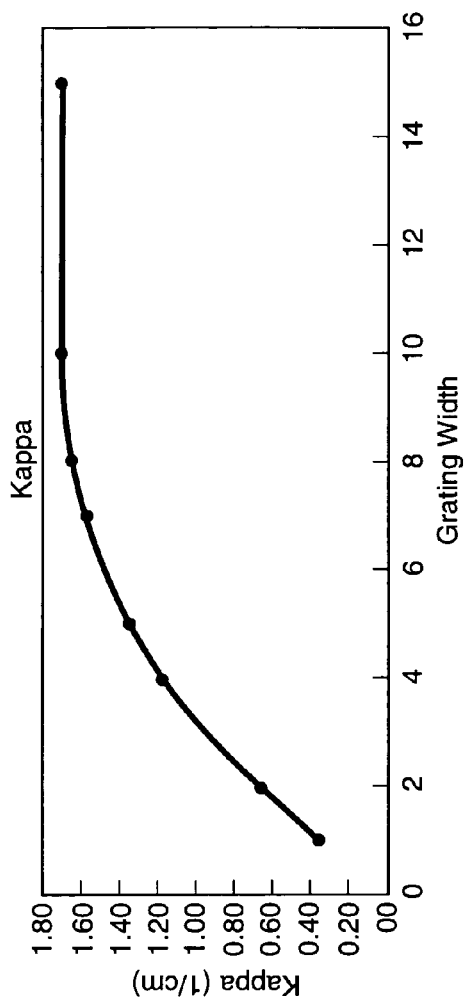
FIG. 6 is a graph showing the variation of coupling coefficient (kappa) with grating width.

As shown in the drawings for purposes of illustration, the present invention is concerned with a technique for forming an apodized optical grating on or in an optical channel waveguide. In accordance with the invention, the grating is apodized by varying the lengths of individual elements of the grating disposed across the width of the optical channel. By this means, all other dimensional parameters of the grating may be maintained constant, including the duty cycle, the grating depth, and the grating elemental length in the principal direction of light propagation.

In a preferred embodiment of the invention, and as shown in FIGS. 1-3, an optical channel waveguide is formed in a dielectric substrate, indicated by reference numeral 10, of a material such as lithium niobate (LNO). As best viewed in FIG. 2, the waveguide is formed by a channel region 12 into which a metal, such as titanium (Ti) is diffused. Light launched into the waveguide will be guided through the channel region 12, as indicated by the arrow 14 in FIG. 1. As best viewed in the top plan view of FIG. 3, multiple parallel grating elements 16 are formed over the channel 12. The grating elements 16 are uniformly spaced and oriented perpendicular to the principal direction of light propagation in the channel 12. The individual lengths of the grating elements 16 are varied as required to obtain desired reflection and transmission filter characteristics in the waveguide. As shown in FIG. 3, for example, the grating elements 16 vary from a minimum length extending over a relatively small proportion of the width of the waveguide channel 12, to a maximum length extending completely across the channel, then back to a minimum length again.

The grating elements 16 can be formed in various ways, either as surface irregularities of the channel 12, or as refractive index variations in the channel. In the presently preferred embodiment of the invention, and as best shown in FIGS. 1 and 2, the grating elements 16 are formed as surface features over the channel 12. Formation of the grating is accomplished by selectively etching a layer 18 of silicon dioxide ($SiO_2$) overlying the channel 12 and a surrounding portion of the substrate 10. The grating elements 16 in this embodiment, shown enlarged in the cross-section view of FIG. 1, have a 50% duty cycle; that is, they consist of a plurality of ridges 20 separated by etched channels 22 having a width the same as the ridge width. The channels 22 are filled with a suitable high refractive index material 24, which also forms a thin layer across the tops of the ridges 20.

The grating elements 16 in FIG. 3 are apodized by selectively varying the lengths of the elements. Stated another way, the effective width of the grating elements 16 is varied, relative to the surface width of the channel 12, to provide a desired reflection or transmission characteristic. By way of contrast, FIG. 4 is a top plan view showing channel elements 16' of uniform size.

Figure 5:
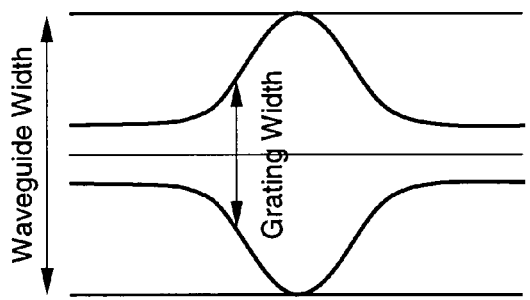
FIG. 5 is a diagrammatic plan view of an apodized grating, showing the variation of grating width over its length.

By varying the width of the grating region, as indicated in FIG. 5, for example, the coupling coefficient (kappa) between counterpropagating optical modes is varied, as plotted in FIG. 6. By varying the coupling coefficient along the propagation direction, the reflection and transmission coefficient of the optical mode field can be controlled at every point along the grating length, to yield the desired reflection and transmission spectral characteristic.

Figure 7:
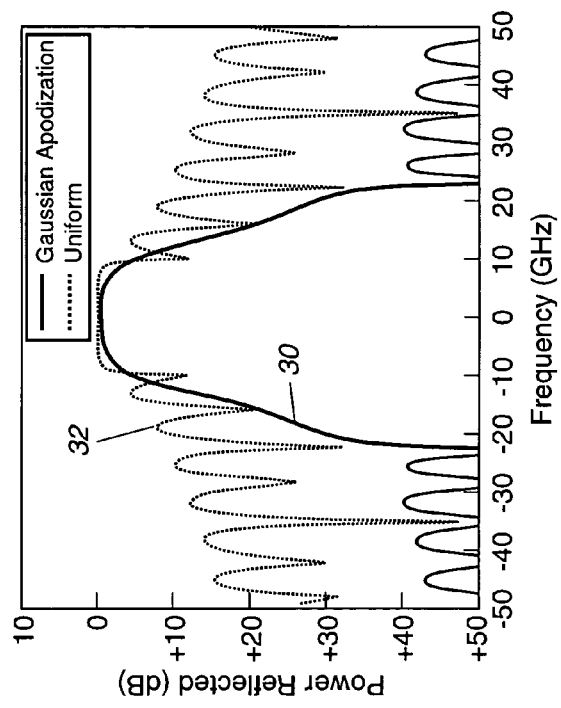
FIG. 7 is a pair of graphs showing the reflection performance of the waveguide of the invention, using the gratings of FIGS. 3 and 4.

The graphs in FIG. 7 plot the power reflected from the grating over a range of optical frequencies, for the two different grating configurations shown in FIGS. 3 and 4. The frequency scale is from −50 to +50 GHz (gigahertz) with respect to the nominal frequency of light transmitted into the channel waveguide. Curve 30 is the reflection response for a Gaussian apodization configuration, similar to that of FIG. 3. It will be observed that the reflection response has a well defined passband in the region from approximately −20 to +20 GHz. Many applications of the invention involve modulation of a light beam with multiple bands of microwave information signals, such as in wavelength division multiplexing (WDM). Using appropriate filter profiles, optical channel waveguides may be conveniently employed in systems that perform modulation and demodulation of optical signals with radio frequency signals. It will be understood, of course, that the passband shown in FIG. 7 is by way of example only. Narrower passbands may be needed in practical communication systems. Curve 32 illustrates by way of comparison the reflection response if the grating is uniform, as shown in FIG. 4.

The principal advantage of the invention over other possible ways to implement an optical channel waveguide having a reflection grating, is that the invention achieves apodization by varying a relatively large feature size, that is the width of the grating relative to the channel. In the presently preferred embodiment of the invention, the channel 12 is approximately 5 microns (5 µm) wide. Fabrication of the apodized grating is, therefore, well within the capabilities of conventional optical lithography. Other approaches prior to the invention require precise control of smaller feature sizes, such as ridge thickness or spacing. Control of these much smaller feature sizes is extremely difficult and renders the fabrication process highly susceptible to errors.

Specific design of an apodized grating to meet known performance characteristics may be accomplished using available numerical filter design techniques analogous to those used in the design of optical fiber gratings.

It will be appreciated from the foregoing that the present invention represents a significant improvement in the art of optical channel waveguides. In particular, the invention provides an optical channel waveguide structure having Bragg-type reflection grating that can be conveniently and reliably tailored to provide a desired reflection or transmission spectral characteristic.

It will also be appreciated that, although specific embodiments of the invention have been described in detail, various modifications may be made that are within the spirit and scope of the invention. For example, although the invention has been described as including a surface-relief grating, the principle of the invention also applies to index modulated gratings, where the refractive index of the channel material is selectively altered to form grating elements of varying length relative to the channel surface width. In general, each grating element can be of either index modulation or surface corrugation. The grating element introduces a perturbation on the waveguide such that the effective index of refraction is different from that of an unperturbed waveguide. The magnitude of perturbation introduced can be varied by controlling the grating element length. This approach can similarly be applied to other forms of waveguides Accordingly, the invention should not be limited except as by the appended claims.

The invention claimed is:

1. An optical channel waveguide and grating, comprising:
   a substrate;
   a waveguide channel formed in the substrate, the channel having a length dimension along which light may be propagated and a width dimension; and
   a periodic grating formed in close association with the waveguide channel, to provide reflection of light at selected frequencies and transmission through the waveguide at other frequencies;
   wherein the periodic grating has multiple parallel elements extending at least part-way across the width dimension of the channel, at least two of the multiple parallel elements having different lengths;
   and wherein the length of each grating element, extending in the width dimension across the channel, is selected to provide an apodized grating with a desired reflection spectral characteristic.

2. An optical channel waveguide as defined in claim 1, wherein:
   the lengths of the grating elements are selected to provide Gaussian apodization.

3. An optical channel waveguide as defined in claim 1, wherein:
   the substrate is a dielectric material;
   the waveguide channel is formed in the substrate by diffusing a metal into the dielectric material.

4. An optical channel waveguide as defined in claim 3, wherein:
   the grating elements are formed as parallel ridges of a material overlying the waveguide channel in a grating region, separated by grooves filled with a material with a refractive index that is high relative to the material overlying the waveguide channel in the grating region.

5. An optical channel waveguide as defined in claim 4, wherein:
   the substrate material is lithium niobate;
   the metal diffused into the substrate to form the channel is titanium;
   the material overlying the waveguide channel in the grating region is silicon dioxide; and
   the material filling the grooves is niobium pentoxide.

6. A method for fabrication of an optical channel waveguide and grating, comprising the steps of:
   forming a surface channel having an elevated refractive index, in a dielectric substrate, the channel having a length dimension along which light may be propagated and a width dimension perpendicular to the length dimension; and
   forming a plurality of parallel grating elements over the substrate and extending in the channel width direction at least part-way across the channel;
   wherein the grating elements are selected in length such that at least two of the grating elements have different lengths to provide apodization of the grating, resulting in a desired spectral characteristic of the waveguide.

7. A method as defined in claim 6, wherein:
   the lengths of the grating elements are selected to provide Gaussian apodization.

8. A method as defined in claim 6, wherein:
   the step of forming the surface channel comprises diffusing a metal into the substrate, which is of a dielectric material.

9. A method as defined in claim 8, wherein the step of forming the grating elements comprises:
   overlaying the waveguide channel, in a grating region, with a layer of silicon dioxide;
   etching away parallel grooves of the silicon dioxide to leave a set of parallel ridges separated by grooves; and
   filling the grooves with a material having a refractive index that is high relative to the layer of silicon dioxide.

10. A method as defined in claim 9, wherein the step of forming the grating further comprises:
    forming an overlying layer of material with a refractive index that is high relative to the layer of silicon dioxide over the grating ridges and filled grooves.

11. A method as defined in claim 10, wherein:
    the substrate material is lithium niobate; and
    the diffusing step comprises diffusing titanium into the substrate.

* * * * *